June 2, 1970  J. S. T. ROBERTSON ET AL  3,515,303
LIGHT REFRIGERATOR CONTAINER
Filed May 22, 1968  3 Sheets-Sheet 2
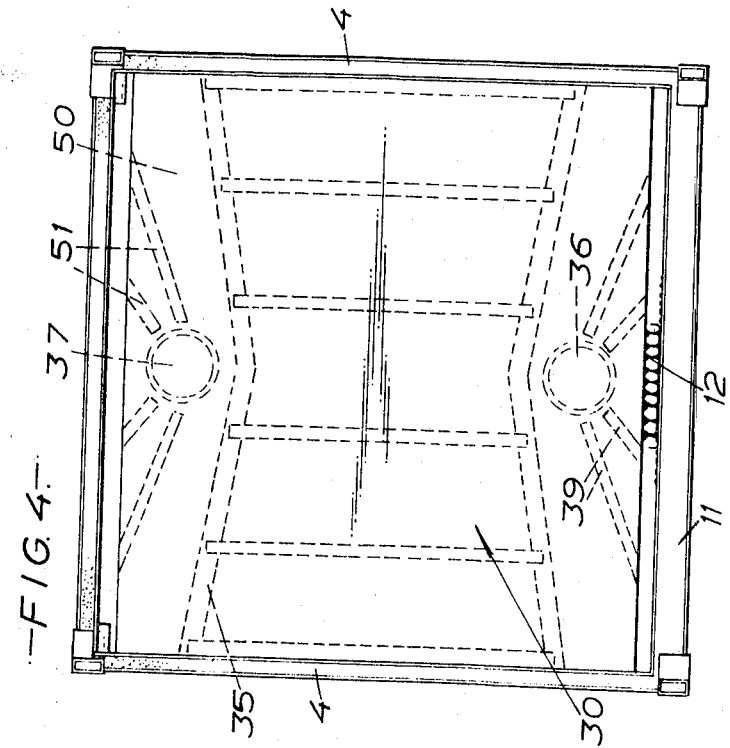
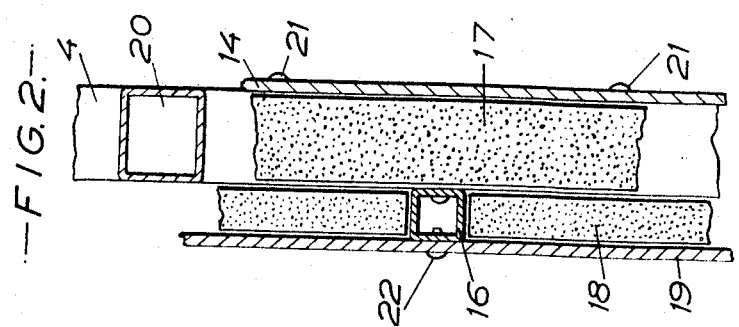
INVENTORS
JAMES S.T. ROBERTSON
WILLIAM JAMES HANNAH
BY
Attorney June 2, 1970     J. S. T. ROBERTSON ET AL     3,515,303
LIGHT REFRIGERATOR CONTAINER
Filed May 22, 1968     3 Sheets-Sheet 3
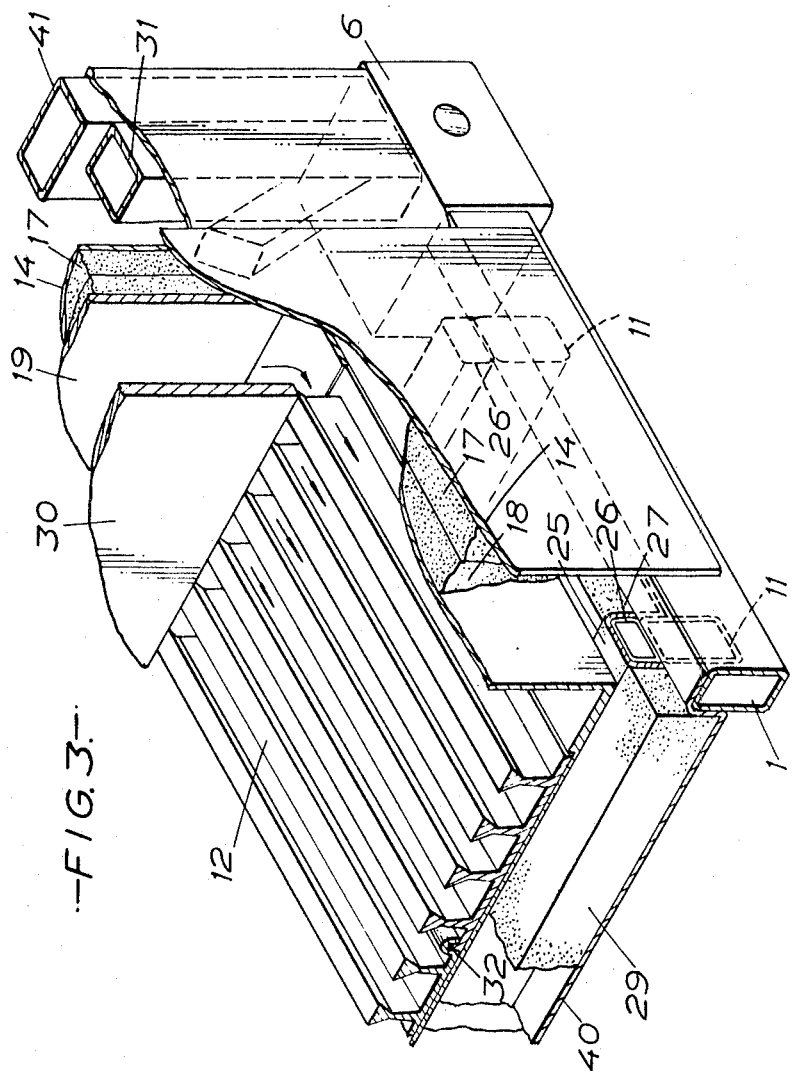
-FIG.3.-
INVENTORS
JAMES S.T. ROBERTSON
WILLIAM JAMES HANNAH 3,515,303
LIGHT REFRIGERATOR CONTAINER
James Strang Terrace Robertson, Wirral, and William James Hannah, Liverpool, England, assignors to A.I.R. (Air Conditioning and Refrigeration) Limited, Glasgow, Scotland, a corporation of Great Britain
Filed May 22, 1968, Ser. No. 731,198
Claims priority, application Great Britain, May 26, 1967, 24,586/67
Int. Cl. B65d 25/18
U.S. Cl. 220—9                                    2 Claims

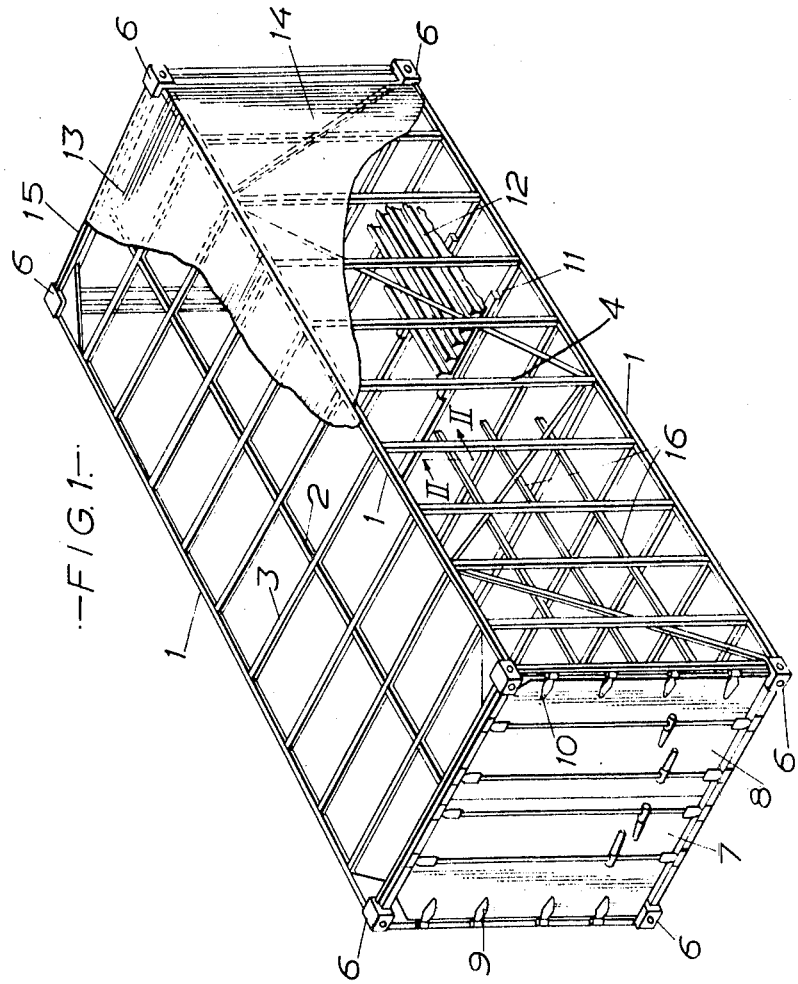

ABSTRACT OF THE DISCLOSURE

A refrigerator goods container consisting of a hollow rectangular steel beam framework covered by protective sheeting of fibreglass on the outside. The spaces between the beams are filled with sheets of polyurethane foam heat insulation and on the inside of the steel framework, hollow rectangular sections of fibreglass are riveted. The spaces between these sections, and the sections themselves, are also filled with foamed polyurethane sheet so that no direct heat conducting path exists from outside to inside of the container, and the inside is also covered with fibreglass sheets. Double insulated doors are provided at one end, and the other end, also thermally insulated, defines inlet and outlet parts for refrigerant air. The outer fibreglass sheets are overlapped and bonded together by adhesive to provide weather proofing.

---

Our invention relates to large containers for carrying materials as for example from one country to another by means of trains, ships or lorries, the material to be carried having to be kept in a cool or frozen condition.

It is known that such containers must be of maximum strength so that they can be stacked, fully loaded, on top of another in the hold of a ship they must be drip-proof and weather proof, and they must be capable of being lifted by a crane or pulled onto the chassis of a lorry. Finally they must be as light as possible so as to give the best overall weight to pay load ratio, combined with maximum heat insulation so that the amount of refrigeration to be supplied to each container is kept to a minimum.

We have provided a form of container which complies with all these requirements. The sides, roof, base and ends of this container are all made of steel hollow rectangular section beams which are welded together at their junctions and intersections. The spaces between the various beams are then filled with a rigid foam heat insulating material in sheet form composed preferably of polyurethane, the thickness of each sheet being approximately equal to the dimensions of the beams between which it fits, in a direction measured from the inside to the outside of the container. A further lining of rigid polyurethane foam is supplied to the inside of the resultant filled framework except for the floor, the interior and exterior surfaces of the sheets of rigid foam being covered with a protective sheet, preferably of fibre-glass laminate. Each steel beam is provided on its inside with one or more hollow fibre-glass section members running lengthwise or cross-wise, these being riveted and stuck onto the steel framework. Further sheets of polyurethane foam constituting the inner lining are placed between the fibre-glass sections, and the inside lining of fibre-glass is riveted and bonded by adhesive to the fibre-glass sections. By this means it is ensured that no direct or partially direct metallic path exists to conduct heat from the outside to the inside of the container.

At one end of the container is a terminal wall with double insulation of the type described, in which two apertures are provided, one for connection to cold air from a refrigerator plant, the other being an exit to atmosphere or to a refrigerator return. The opposite end is provided with two doors hinged on vertical side members, the doors being insulated with an expanded polyurethane foam as described for the sides. The doors are adapted to open through an angle of 270 degrees so that they can fold flat against the sides of the container, leaving one end thereof completely open.

As regards the flooring, this must of course be much stronger than the sides and roof of the container, since it has to support the whole weight of the load, and of any trollies which may be employed in order to stack the load or remove it. To this end we produce a floor structure which consists of a plurality of parallel hollow steel beams as described above, the beams extending from side members of the container across its width. These beams are covered with a fibre-glass sheet moulding which extends between the beams from side to side and end to end of the container, the spaces between the beams being filled, in depressions of the fibre-glass sheet laid on them, with sheets of rigid polyurethane foam. On top of each beam is laid a rectangular hollow section of fibre-glass, the fibre-glass sheet moulding extending over the top of both the beams and the fibre-glass sections. Again this construction prevents any direct metallic path from inside of the container to the outside. Finally a flooring is laid on top which consists of a series of aluminum reefer decking sections the bases of which interlock and are sealed to prevent moisture from dripping through onto the heat insulation. By this means a very strong floor is produced over which trollies or the like can run in order to stack or remove loads, and yet in which the insulation between the inside of the flooring and the outside of the container is as thick as possible combined with lightness and strength.

According therefore to our invention a container for carrying good subject to refrigeration or low temperature comprises a framework of hollow steel beams forming the sides, base, top and one end of the container, in which at least the sides, top and one end contain a filling of heat insulating material such as rigid foam plastics between the beams, an outer protective sheet covering for the container applied and fixed to the beams, rigid hollow sections of heat insulating material such as fibre-glass fixed to the inside of the framework beams, the spaces between these sections being filled with further heat insulating material, and an inner protective sheet affixed to the heat insulating sections.

Reference should now be made to the accompanying drawings, in which:

FIG. 1 is a perspective view of a container showing various features of the construction, FIG. 2 is a section of a side wall of the container in the direction II—II of FIG. 1, FIG. 3 is a section of one corner of the container showing details of the floor and of the end at which cold air is admitted, FIG. 4 is an interior view of the end of the container opposite the doors.

Referring to FIG. 1, it will be seen that the container consists of side beams 1, a top stiffener beam 2 and transverse beams 3, 4, 11. All these beams are made of steel and are of hollow rectangular cross-section. The side beams 1 terminate in end caps 6, and these are pierced with holes to enable grabs or hooks to be fastened to the container for lifting purposes.

At one end there are two doors, 7, 8 provided with hinges through an angle of 270 degrees each so that each door can be folded back flat against the adjacent vertical side. There are also steel floor beams 11 and a series of aluminum reefer decking sections 12, and all the sides, ends, top and bottom are provided with heat insulation of a type to be described later. The whole of the outside of the container is covered with protective sheets 13, 14 these sheets being of fibre-glass, each sheet being riveted and secured by adhesive to the parts of the steel frame over which it is laid. The sheets are joined at the points where they are fastened to the frame members 1, and secured to one another by an adhesive so as to render the construction substantially drip-proof, and the end 15 of the container is provided with an inlet and an outlet for a refrigerant gas such as cold air.

Along the inside of the beams 4 there are provided sections 16 of hollow rectangular shape, made of fibre-glass, these sections being riveted and stuck to the beams 4. Similar fibre-glass sections are riveted to the insides of the other side and the top, these being for the purpose of supporting the internal linings and thoroughly insulating the inside of the container from the steel framework.

From FIG. 2, which is a vertical section of a side wall, it will be seen that the wall consists of a number of vertical frame members 4, the shape of the section of which is shown at 20. Between each pair of vertical frame members there is a vertical sheet 17 of rigid expanded or foamed plastics material preferably polyurethane, to act as heat insulation. The whole of the outside of one side of the framework is covered with a sheet 14 of fibre-glass, the glass being riveted at 21 to the vertical frame members 4. Adhesive may also be used.

On the inside, each vertical frame member carries a number of horizontal extruded section 16 of fibre-glass, these being of hollow rectangular form as shown. The sections are riveted and fastened by adhesive to the frame members 4, and the spaces between the sections are filled by horizontal sheets 18 also of expanded plastics material. The side is completed by an inner layer 19 of fibre-glass which is riveted to the sections 16 at 22, and maybe stuck thereto and to the underlying foam material. Adhesives are preferably used wherever possible in order to improve the rigidity and strength of the whole container, whilst retaining the lightness of the structure. All the fibre-glass hollow sections are filled with polyurethane foam.

An exactly similar construction is used for the other side of the container, and also for the roof, so that these will not be further described in detail. It will be seen from this construction that no metal path exists from the outside of the container directly to the inside, the path being broken by the fibre-glass sections 16, so that no hot spots or lines occur on the inside of the refrigerator due to heat conduction thereinto by the metal framework. The latter provides the strength required for the container, and the sections 16 provide the necessary insulation in conjunction with the expanded foam sheets 17, 18 and the fibre-glass coverings 14 and 19.

FIG. 3 shows a portion of one corner of the frame at the end of the container into which cold air is introduced. There is an end cap 6 with a longitudinal steel beam 1 welded thereto, with vertical beams 41 and 31, each being a rectangular steel section. The side covering 14 is shown, and there are a number of transverse steel beam sections 11. All the steel sections are welded together at their points of contact and intersection.

On top of each transverse steel beam there is a rectangular section of fibre-glass 26, and over the whole of the lower portion of the framework there is laid a sheet 25 of fibre-glass. The fibre-glass sheet drops into the spaces between the steel and the fibre-glass sections, and rises over their crests as shown. In the spaces between the floor sections there are sheets of rigid foam material 27, 29, and an inner fibre-glass sheet 19 of the side is bent round as shown to join up and seal with the reefer decking 12. This latter is composed to strips of aluminum of the section shown, the strips overlapping where necessary at 32, where they are sealed by rubber inserts, rendering the floor watertight. The tops of the reefer deck sections form a strong flooring over which trollies bearing articles to be carried by the container may be run.

The end of the container, seen also in FIG. 4, consists as in the case of the sides of vertical and horizontal steel beams, these not being shown in this particular drawing, with fibre-glass sheets 14, 19 affixed thereto with rigid foam material 17 between them. There are also baffle plates 30, 50, made of multi-ply wood or fibre-glass, one being located on the ends of the reefer decking, so as to leave a space between the ply wood and the inner fibre-glass sheet 19. This space acts as a duct for cold air as described later, the air passing down between the wood and the fibre-glass and between the upstanding portions of the reefer decking, and so under the cargo.

From FIG. 4 it will be seen how the cold air is supplied. The end consists of the usual steel and fibre-glass beam construction which will not be described further, together with a baffle frame of fibre-glass sections 35, these being fastened to the inside of the rear wall.

Two large apertures 36, 37 extend from the outside of the container to the inside, and these are surrounded by baffle sheets 30, 50. The sheet 30 is spaced at some distance away from the opening 30, so that cold air can be blown in through the aperture 36, passed between the baffles 39 and the plate 30, and thus into the spaces between the reefer decking members 12. The outside of the aperture 36 is provided with means for connecting it to a supply of cold air if required, or alternatively during a relatively short transit the hole may be covered with a heat insulated cap. A similar connection or cap can be applied to the hole 37. Cold air entering through aperture 36 passes under the flooring, round the goods in the container and makes its exit over the baffle 50, between the baffles 51, and aperture 37, to be returned to the refrigerator apparatus.

If necessary, protective battens may be applied to the fibre-glass sheets on the inside of the container to protect them from damage by cargoes, and to assist in circulation of the cold air.

In view of the strength of the container combined with its lightness, a high ratio of pay load to total weight is attained. In addition, the container is found to be so strong that it may be lifted either from the holes in the caps at the base of the container, or from the holes in the caps at the top.

We claim:

1. A container for carrying goods subjected to low temperature, comprising a framework of hollow steel beams forming the sides, base, top and one end of said container, wherein the sides, top and one end contain a filling of heat insulating material between said beams, an outer protective sheet covering applied and fixedly secured to said beams, a plurality of rigid hollow sections of heat insulating material fixedly secured to the inside of said framework beams transversely thereto, a further filling of heat insulating material in the spaces between said sections and an inner protective sheet affixed to the inner faces of said insulating sections, said steel beams and said rigid hollow sections of heat insulating material are all of rectangular transverse cross-section with a filling of foamed plastic material in each said rigid hollow section, the base of said container comprises a plurality of steel cross-beams, a hollow heat insulating section laid on and secured to the top of each beam, at least one sheet of fibreglass laid oversaid beams and sections with depressions between adjacent sections, heat insulating material filling said depressions, and a flooring of reefer decking sections laid on said sheet and in contact therewith at the parts of said sheet overlying said insulating sections.

2. A container for carrying goods subjected to low temperature, comprising a framework of hollow steel beams forming the sides, base, top and one end of said container, wherein the sides, top and one end contain a filling of heat insulating material between said beams, an outer protective sheet covering applied and fixedly secured to said beams, a plurality of rigid hollow sections of heat insulating material fixedly secured to the inside of said framework beams transversely thereto, a further filling of heat insulating material in the spaces between said sections and an inner protective sheet affixed to the inner faces of said insulating sections, hinged double doors at a first end, a heat insulated second end opposite said first end, a pair of apertures defined in said second end, means for connecting a gas conduit to one aperture and a return conduit for said gas to the other aperture, and gas baffles adjacent the insides of both apertures to direct the flow of gas.

References Cited

UNITED STATES PATENTS

| | | | |
|---|---|---|---|
| 1,705,928 | 3/1929 | Lambert. | |
| 2,256,375 | 9/1941 | Bonsall. | |
| 2,295,103 | 9/1942 | Friedly | 220—9 |
| 2,869,751 | 1/1959 | Klope et al. | 220—15 |
| 3,003,810 | 10/1961 | Kloote et al. | |
| 3,061,133 | 10/1962 | Reynolds | 220—10 X |
| 3,122,259 | 2/1964 | Meesen | 220—15 |
| 3,298,345 | 1/1967 | Pratt | 220—15 X |
| 3,339,778 | 9/1967 | Herrenschmidt | 220—9 |

FOREIGN PATENTS

| | | |
|---|---|---|
| 481,267 | 3/1938 | Great Britain. |
| 1,108,045 | 3/1968 | Great Britain. |

JOSEPH R. LECLAIR, Primary Examiner

J. R. GARRETT, Assistant Examiner